United States Patent [19]

Cohen

[11] Patent Number: 4,676,458
[45] Date of Patent: Jun. 30, 1987

[54] DEPLOYMENT MECHANISM FOR A RAM AIR TURBINE

[75] Inventor: Mordehy Cohen, Rockford, Ill.

[73] Assignee: Sundstrand Corporation, Rockford, Ill.

[21] Appl. No.: 685,475

[22] Filed: Dec. 24, 1984

[51] Int. Cl.4 ............................................. B64D 41/00
[52] U.S. Cl. .................................. 244/58; 244/137 R
[58] Field of Search ................. 244/58, 137 A, 137 R, 244/102 R; 74/103, 105; 414/917, 495, 751, 752; 254/8 C, 9 B, 9 C, 10 B, 10 C

[56] References Cited

U.S. PATENT DOCUMENTS

| | | | |
|---|---|---|---|
| 1,733,891 | 10/1929 | Loudy | 244/58 |
| 2,506,976 | 5/1950 | Tharratt | 244/74 |
| 2,622,390 | 12/1952 | Newton | 60/13 |
| 2,920,773 | 1/1960 | Knabe | 414/917 |
| 3,069,116 | 12/1962 | Ward | 244/58 |
| 3,149,678 | 9/1964 | Chilman et al. | 170/76 |
| 3,273,654 | 9/1966 | Pinnes | 170/135.7 |
| 3,341,042 | 9/1967 | Carder | 414/495 |
| 3,370,727 | 2/1968 | Shaw | 414/495 |
| 4,130,258 | 12/1978 | Fox | 244/58 |
| 4,400,985 | 8/1983 | Bond | 414/752 |
| 4,411,596 | 10/1983 | Chilman | 416/51 |

FOREIGN PATENT DOCUMENTS 943917  3/1949  France .................. 244/102 R
2087835 11/1986  United Kingdom ........... 414/495

Primary Examiner—Galen Barefoot
Assistant Examiner—Lynn M. Fiorito
Attorney, Agent, or Firm—Wood, Dalton, Phillips, Mason & Rowe

[57] ABSTRACT

Deployment mechanism for a ram air turbine has conventionally consisted of a strut pivotally mounted within a storage bay of an aircraft and which pivots to a downwardly-extending position to bring the ram air turbine into deployed position. Such a structure has required a storage bay in the aircraft having a large stowing volume because of the primarily rotational movement of the ram air turbine and has not maximized the speed of deployment of the ram air turbine. The improved deployment mechanism for the ram air turbine has front and rear linkages pivotally connected at one of their ends within the storage bay of the aircraft and their other ends pivotally connected to the ram air turbine and includes a spring-loaded deployment actuator operable to move the ram air turbine from stowed position. The front and rear linkages are constructed and mounted at pivot joints to provide primarily a linear motion of the ram air turbine in moving between stowed and deployed positions to provide for fast deployment and also minimize the volume of the storage bay and the area of the access doors thereto.

6 Claims, 5 Drawing Figures

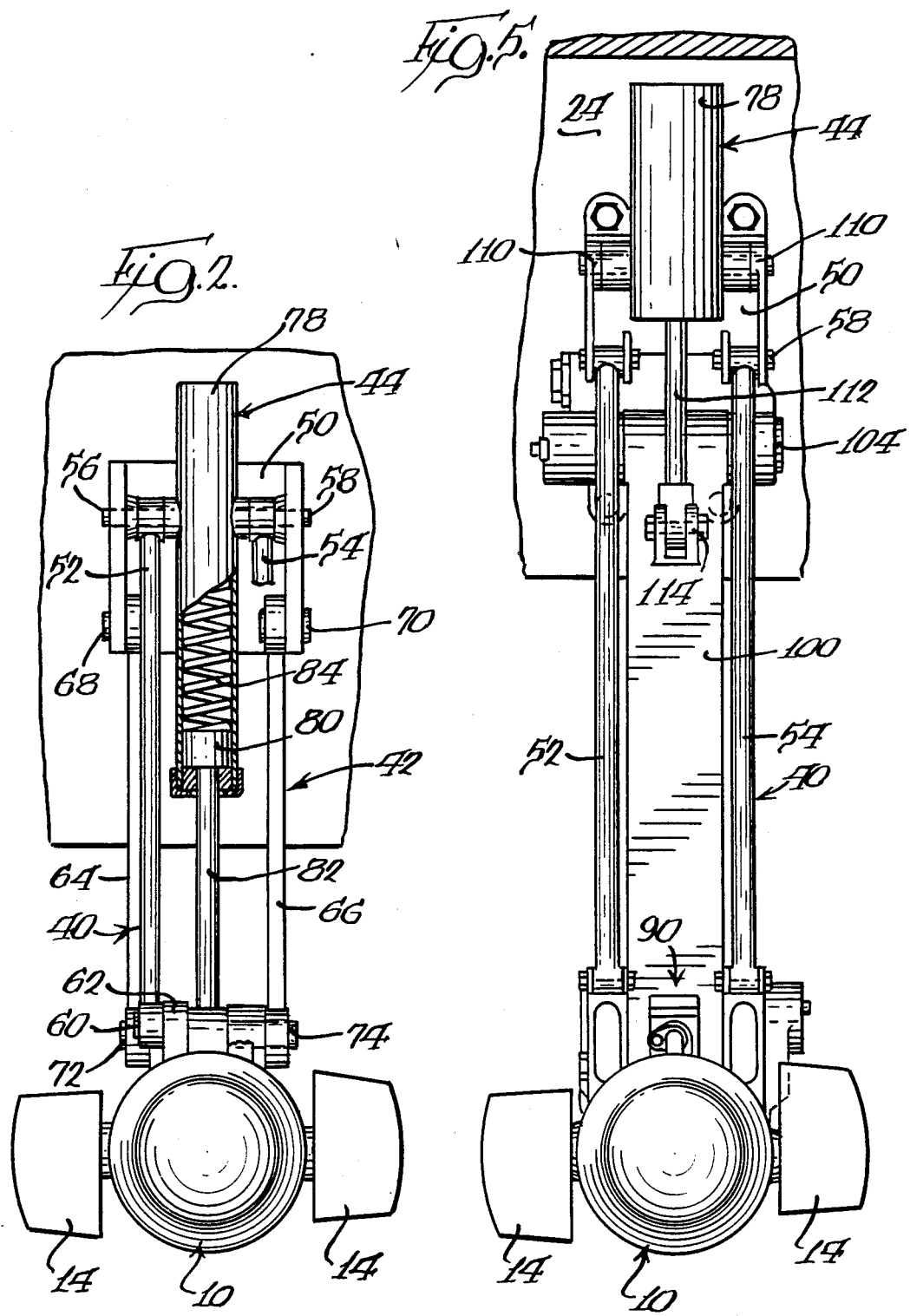

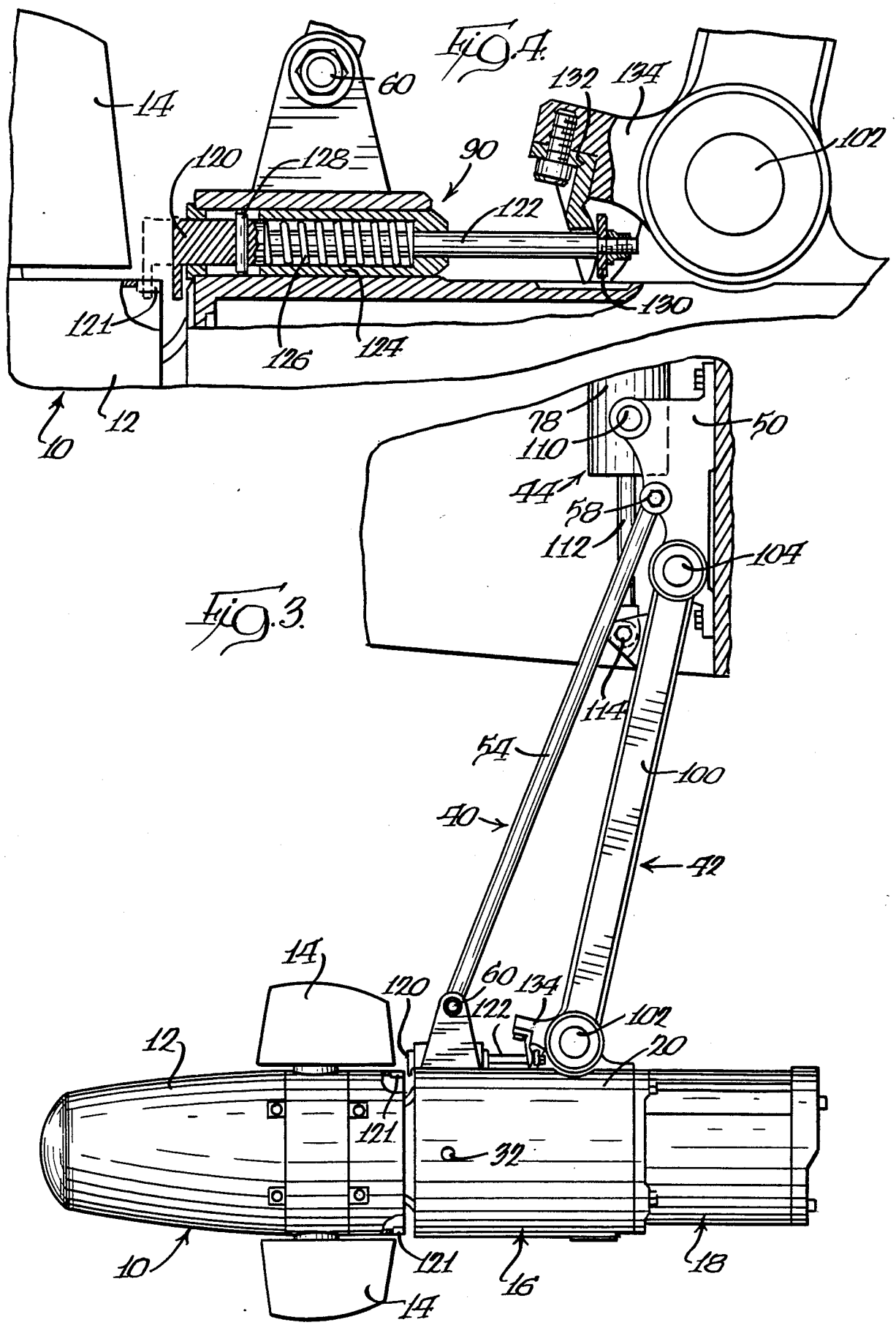

DEPLOYMENT MECHANISM FOR A RAM AIR TURBINE

DESCRIPTION

1. Technical Field

This invention relates to an improvement in deployment mechanism for a ram air turbine.

2. Background of the Invention

For many years, aircraft have included, as standard equipment, a back-up power source for use in times of power outage in the main power system. This standard equipment has been in the form of an air-driven turbine or fan which has a normal stowed position within the fuselage of the aircraft and which can be moved to a deployed position in the airstream, thereby making use of the relative speed of the aircraft through the ambient air to cause the turbine blades to rotate. The ram air turbine can have either electrical generating gear or a hydraulic pump or both which are powered by rotation of the blades due to the movement through the air.

The Chilman Pat. No. 4,411,596, owned by the assignee of this application, discloses a ram air turbine having variable pitch blades 11 and 11a mounted on a rotatable hub assembly and which can rotate about a longitudinal axis for rotating a drive shaft 14 rotatably mounted on a support 13. The Chilman patent shows, in broken line in FIG. 1, a mounting strut of a conventional deployment mechanism which is pivotally mounted within a storage bay of the aircraft and which can pivot between the ram air turbine deployed position, shown in FIG. 1, and a clockwise rotative position to place the strut and the ram air turbine in a stowed position within the aircraft storage bay.

The strut has suitable electrical and hydraulic lines associated therewith for communicating the generator and pump, respectively, with power circuits in the aircraft.

The storage bay of the aircraft, as well as the access door, must be sized to store the ram air turbine and the deployment mechanism, including the pivotally mounted strut. It will be seen that the strut of the Chilman patent requires a storage bay of a substantial height, since, when in stowed position, the ram air turbine will extend upwardly from a generally horizontally extending or slightly upwardly inclined strut. Also, there is a substantial arc of movement of the ram air turbine in moving from the deployed position. The longitudinal axis of the ram air turbine will undergo substantial rotation from a generally vertical orientation when in stowed position to a generally horizontal orientation when in deployed position.

A further feature of the known deployment mechanism is the use of indexing mechanism to orient the ram air turbine blades in a predetermined rotative position when the ram air turbine is stowed. As seen in FIG. 1 of the Chilman patent, the locking of the blades in the position shown therein effectively reduces the width of the ram air turbine and, thus, the required width for the storage bay. The indexing mechanism has been a spring-loaded detent mounted on a support, such as the support 13 of the Chilman patent, and which is released when the ram air turbine reaches deployed position by movement of a cable connected to the detent and to some operative mechanism at the pivot mounting of the strut within the storage bay of the aircraft.

SUMMARY OF THE INVENTION

The present invention relates to an improved deployment mechanism for a ram air turbine. The deployment mechanism minimizes the required stowing volume of the storage bay in the aircraft as well as the area of the access door thereto. Additionally, the deployment mechanism provides for fast deployment of the ram air turbine from stowed to deployed position. Further, the deployment mechanism provides improvement in withstanding loads encountered when the ram air turbine is deployed and improves the efficiency in operation by minimizing drag load and disturbance of the airflow to maximize the aerodynamic performance of the ram air turbine. Also, the structure of the deployment mechanism minimizes the weight thereof which is an important consideration in aircraft utilization.

In achieving the foregoing, the ram air turbine has the generator and/or pump stacked in line and all supported by the housing of one of the components. When both a generator and pump are driven and the generator is next to the ram air turbine, the generator housing is the primary support and this housing is connected to the aircraft structure by the deployment mechanism. The deployment mechanism has three main components, namely, a front linkage, a rear linkage and a spring-loaded deployment actuator. In the stowed position, wherein the components are positioned within a storage bay provided within the aircraft fuselage, the components are held by an up-lock and the spring of the spring-loaded deployment actuator is fully compressed. When the up-lock is released by a suitable signal from the aircraft cockpit, the deployment actuator is effective to move the deployment mechanism and the ram air turbine and associated structure out of the storage bay to the deployed position in the airstream. The positioning of the ram air turbine in the deployed position effects operation of an indexing mechanism to release the blades of the ram air turbine for rotation.

A primary object of the invention is to provide a deployment mechanism for a ram air turbine providing for less arc of movement of the ram air turbine between stowed and deployed positions which results in fast deployment of the ram air turbine and minimizes the volume of a storage bay in the aircraft fuselage as well as the area of the access door thereto.

Another object of the invention is to provide a deployment mechanism providing the new and improved results set forth in the preceding paragraph and which, additionally, is constructed to, with minimum weight, withstand deployment loads, air loads and vibrational loads as well as minimize the drag load on the mechanism in the airstream and disturbance of the airflow to maximize the aerodynamic performance of the ram air turbine.

An additional object of the invention is to provide a deployment mechanism for a ram air turbine which minimizes the weight of the required structure of the deployment mechanism.

The foregoing objects are achieved by a deployment mechanism having a front linkage and a rear linkage each having at least one link pivotally connected at spaced locations at one end within the storage bay of the aircraft and having a second end pivotally connected at pivot joints at spaced locations on a housing associated with the ram air turbine. The linkages are constructed and arranged to provide primarily a linear motion, rather than rotational motion of the ram air turbine in moving between stowed and deployed positions to result in a lesser arc of movement with resultant reduction in the required stowing volume of the storage bay and the fast deployment of the ram air turbine.

The front and rear linkages are short and are subjected mainly to tension/compression types of loads and, therefore, may be sized smaller than deployment mechanism using structure, such as a pivoted strut, which is subject to bending forces. The linkages are relatively small in cross section; the location of the pivot joints for the front linkage is at a distance from the blades of the ram air turbine; the indexing mechanism does not require a long cable for release of the detent thereof to free the blades for rotation; and the linkages can be mounted to a single mounting base located within the storage bay of the aircraft.

An additional object of the invention is to provide a deployment mechanism for a ram air turbine having a housing and movable between stowed and deployed positions comprising, a first link pivotally connected at one end to the housing of the ram air turbine and at its other end pivotally connectable to a support to enable pivoting of the ram air turbine relative to the first link as the ram air turbine moves between stowed and deployed positions, and a second link pivotally connected to the ram air turbine housing and pivotally connectable to said support for controlling the orientation of the ram air turbine relative to the first link.

Still another object of the invention is to provide a deployment mechanism for a ram air turbine carried by an aircraft and usable to drive a mechanism, such as a generator or a pump and having a stowed position inside a storage bay of the aircraft and a deployed position outside the aircraft to extend longitudinally of the aircraft and the airstream comprising, a mounting base positionable at an end of the storage bay, a front linkage having at least one front link extending between the ram air turbine and said mounting base and pivotally connected thereto, a rear linkage having at least one rear link extending between the ram air turbine and the mounting base and pivotally connected thereto at locations rearwardly of the pivot connections of the front linkage, and an actuator pivotably mounted on said mounting base and having a movable member pivotally connected to said ram air turbine, said front and rear links being of a length and their pivot connections located to provide for movement of the ram air turbine between stowed and deployed positions with said ram air turbine moving primarily linearly between said positions with little rotation about an axis transverse thereof to minimize the volume of said storage bay.

BRIEF DESCRIPTION OF THE DRAWINGS

FIG. 2 is an end elevational view, taken generally along the line 2—2 in FIG. 1, with parts broken away;

FIG. 3 is a view similar to FIG. 1 of a second embodiment of the invention with the ram air turbine shown in deployed position;

FIG. 4 is a fragmentary view of part of the structure shown in FIG. 3 on an enlarged scale and with parts broken away to illustrate an indexing mechanism; and FIG. 5 is a view similar to FIG. 2 of the structure shown in FIG. 3.

DESCRIPTION OF THE PREFERRED EMBODIMENTS

Figure 1:
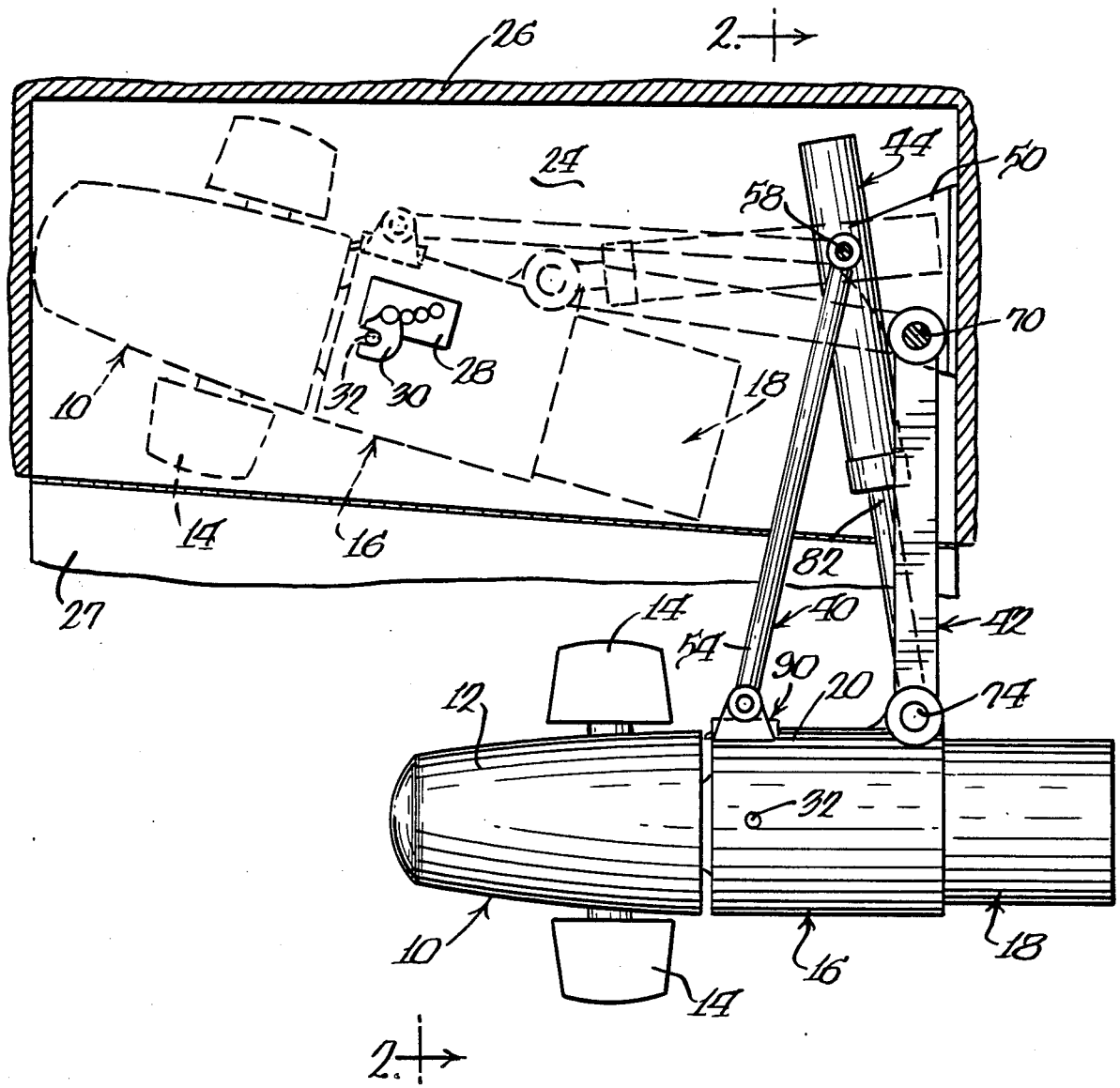
FIG. 1 is a side elevational view of the ram air turbine and deployment mechanism shown in deployed position in full line and in stowed position in broken line.

In the embodiment of FIGS. 1 and 2, a ram air turbine, indicated generally at 10, is enclosed by a cover 12 and mounts a series of variable pitch blades 14 for rotation about the longitudinal axis of the ram air turbine. When in deployed position in association with an aircraft in flight, the airstream resulting from movement of the aircraft through the air cause the blades 14 to rotate the ram air turbine. The ram air turbine has associated with it a generator, indicated generally at 16, and a pump, indicated generally at 18.

The generator is connectable into the main power system for supplying electrical power when there is a power outage in the main power system. The hydraulic pump 18 is connectable into a hydraulic power circuit for supplying hydraulic power when there is a failure in the main hydraulic power system. Although both a generator and pump are shown, it will be evident that, if desired, only one or the other of the pump and generator may be used with the ram air turbine.

The generator 16 has a housing 20 which mounts bearing means for rotatably supporting a drive shaft of the ram air turbine, with this drive shaft being connected to components of the generator 16 and the pump 18. This general structure of a ram air turbine and associated power supply means is known in the art, with one showing thereof being in the aforesaid Chilman Pat. No. 4,411,596 and the disclosure thereof is incorporated herein by reference.

The ram air turbine has a stowed position within a storage bay 24 of an aircraft, with aircraft components defining the storage bay shown in section at 26. Access to the storage bay 24 is provided by means of a pair of hinged access doors 27 which are closed when the ram air turbine is in stowed position and which can open preparatory to deployment of the ram air turbine. A portion of one open door 27 is shown in FIG. 1.

The ram air turbine is held in stowed position by means of a conventional up-lock 28 having a catch pawl 30 which coats with a pin 32 on the housing 20 of the generator. When the ram air turbine is to be deployed, the access doors 27 are opened and a signal from the aircraft cockpit, either mechanically through a cable or electrically, releases the catch pawl 30 and the weight of the ram air turbine together with the actuator load will cause the catch pawl to pivot counterclockwise, as seen in FIG. 1, out of engagement with the pin 32.

The deployment mechanism for the ram air turbine comprises three major components. These components are a front linkage, indicated generally at 40, a rear linkage, indicated generally at 42, and a spring-loaded deployment actuator, indicated generally at 44. The deployment mechanism is constructed and arranged to have pivotal movement to achieve primarily a linear motion of the ram air turbine 10 in moving from the stowed position to the deployed position. With this primarily linear motion, there is only a limited amount of rotation of the ram air turbine about a transverse axis to enable fast deployment of the ram air turbine, as well as minimizing the stowing volume of the storage bay 24 and minimizing the area of the access doors 27.

The primary components of the deployment mechanism are all pivotally mounted within the storage bay 24 and may be directly connected thereto. However, as shown, a mounting base 50 is secured to a wall of the aircraft structural component. The front linkage 40 has a pair of laterally spaced-apart front links 52 and 54 pivoted to the mounting base at one of their ends at pivot joints provided by pivot pins 56 and 58. These links are slender in cross section. The opposite ends of the front links 52 and 54 are pivotally connected to the generator housing 20 at pivot joints provided by a pivot pin 60 passing through a bracket structure 62 fixed to the generator housing 20. The rear linkage 42 has a pair of laterally spaced-apart rear links 64 and 66 of slender cross section pivoted at their upper ends to the mounting base 50 at pivot joints provided by pivot pins 68 and 70. The opposite ends of the rear links 64 and 66 are pivotally connected to the generator housing 20 at pivot joints provided by pivot pins 72 and 74 mounted in bracket structure supported by the generator housing 20.

The spring-loaded deployment actuator 44 has a cylinder 78 pivotally connected intermediate its ends to the mounting base 50 by the pins 56 and 58 associated with the front linkage 42 and movably mounts a piston 80 having a piston rod 82 extendable therefrom and which is pivotally connected to the generator housing 20 by the pivot pins 72 and 74 associated with the rear linkage 42.

A spring 84 within the cylinder is compressed when the ram air turbine is in stowed position whereby, upon release of the ram air turbine for deployment by release of the up-lock, the spring will immediately cause the ram air turbine to move toward the deployed position. Although not shown, it is conventional to have a hydraulic dashpot structure within the cylinder 78 which will retard the rate of movement of the ram air turbine as it approaches the deployed position in order to have the ram air turbine move into the final deployed position without any shock to the structure.

The front and rear linkages have their upper pivot joints and lower pivot joints related whereby the front and rear links extend generally parallel to each other and normal to the ram air turbine when the ram air turbine is in a deployed, generally horizontal position and also generally parallel when in stowed position, as seen in broken line in FIG. 1. This structural arrangement includes having the rear links 64 and 66 of a shorter length than the front links 52 and 54 and having the pivot joints of the rear linkage below and rearwardly of the upper pivot joints for the front links.

The front and rear linkage structure provides a deployment mechanism of minimal weight, with a number of improved operating characteristics including improved capability of withstanding deployment loads, air loads and vibrational loads. The links are subjected mainly to tension/compression types of loads and do not require as much strength as would be required if a support structure, such as a strut, were used and which is subject to bending. Additionally, the linkages are short. The laterally-spaced small diameter links present a small area projection in the flow direction of the airstream to minimize drag loads when the ram air turbine is deployed. The front links being of small diameter and at a distance from the ram air turbine blades result in a minimum disturbance of the airflow to maximize turbine aerodynamic performance. The oil passages to the pump 18 can be incorporated within one of the rear links 64 and 66 and the electrical lines from the generator 16 can be suitably secured to one of the links.

As previously mentioned, the primary advantages also include the fast deployment with minimum volume of the storage bay 24 and the size of the access doors 27 because of the primarily linear movement of the ram air turbine between stowed and deployed positions. After use of the ram air turbine, the aircraft will be on the ground and the ram air turbine can be manually repositioned in the stowed position shown in broken line in FIG. 1.

It is previously known to locate the ram air turbine blades 14 in a predetermined rotative position to fit within the storage bay, with the blades being held in this position by an indexing mechanism which is released when the ram air turbine moves to deployed position. An improved indexing mechanism located at a pivot joint is indicated generally at 90 and has a detent extendable to hold the blades in a predetermined rotative position and which can be released by relative movement between the front linkage 40 and the generator housing 20. A structure of this type is more particularly described in connection with the embodiment of FIGS. 3 to 5.

In the embodiment of FIGS. 3 to 5, the structure the same as that shown in the embodiment of FIGS. 1 and 2 has been given the same reference numeral.

The embodiment of FIGS. 3 to 5 differs in one primary respect from the embodiment of FIGS. 1 and 2 by having the rear linkage 42 formed as a single strut 100 which is pivoted at a pivot joint 102 to the generator housing 20. The opposite end of the strut 100 is pivoted to the mounting base 50 at 104. The pivot joints of the strut 100 are located relative to the pivot joints of the front linkage 40 generally in the same manner as in the embodiment of FIGS. 1 and 2. The spring-loaded deployment actuator 44 has a separate pivot to the mounting base 50, as indicated at 110, and has a piston rod 112 pivotally connected at 114 to the strut 100 near the upper end thereof. The deployment mechanism of the embodiment of FIGS. 3 to 5 also provides for primarily a linear motion of the ram air turbine in moving from a stowed position, not shown, to the deployed position shown in FIG. 3.

The indexing mechanism 90 has a spring-loaded detent member 120 movable between the released position, shown in full line in FIG. 4, and a detent position, shown in broken line, in which the ram air turbine blades 14 are held against rotation by coaction with the rotatable cover 12 of the ram air turbine. The detent member 120 has a rod 122 associated therewith extending through a case 124 secured to the generator housing 20 and having a spring chamber in which a spring 126 is mounted. Slots in the case 124 coact with a pin 128 to preclude rotation of the detent member 120. The spring 126 normally urges the detent member 120 to the detent position and the detent member can be moved to the released position by coaction between a disc 130, carried at the end of the rod 122, and a cam member 132. The cam member 132 is carried on an arm 134 integral with the strut 100 and, therefore, moves through an arc as the ram air turbine is deployed. When the ram air turbine is in stowed position, the cam member 132 is at a distance from the disc 130 and the spring 126 is operative to maintain the detent member 120 in detent position, as shown in broken line in FIG. 4. As the ram air turbine approaches deployed position, the cam member 132 is moving through an arc and the bifurcated end thereof moves to either side of the rod 122 and engages the left-hand face of the disc 130, as seen in FIG. 4. The final relative movement between the cam member 132 and the disc 130 causes the rod 122 to move to the right and bring the detent member 120 to release position.

With the disclosed structure, it will be evident that the deployment mechanism provides for primarily linear motion of the ram air turbine in moving between stowed and deployed positions, with there being at least one front link and one rear link. One of the links enables pivoting of the ram air turbine relative thereto and a second of the links is pivotally connected to the ram air turbine for controlling the orientation of the ram air turbine relative to the first link.

I claim:

1. A deployment mechanism for a ram air turbine movable between stowed and deployed positions and having a mounting base mountable on an aircraft frame component comprising, a front link having a rear pivot joint connection to said mounting base and a front pivot joint connection to the ram air turbine and changing from a generally horizontal to a generally vertical disposition as the ram air turbine moves from stowed to deployed position, a rear link having a rear pivot joint connection to said mounting base beneath said rear pivot joint connection of the front link and a pivot joint connection to the ram air turbine rearwardly of the front link pivot joint connection, said rear link extending generally horizontal in side-by-side parallel relation with and beneath the front link when the ram air turbine is in stowed position and moving to a generally vertical position and in parallel side-by-side relation with the front link when the ram air turbine is deployed.

2. A deployment mechanism as defined in clai 1 wherein there are a pair of said front links which are spaced apart laterally of the ram air turbine and which are relatively slender in cross section to assist in minimizing drag loads.

3. A deployment mechanism as defined in claim 1 wherein there are a pair of said rear links which are spaced apart laterally of the ram air turbine and which are relatively slender in cross section to assist in minimizing drag loads.

4. A deployment mechanism as defined in claim 1 wherein there are a pair of said front links laterally spaced from each other and there are a pair of said rear links laterally spaced from each other, and an actuator pivotally connected between said mounting base and said ram air turbine and positioned in the space between said pairs of laterally spaced front and rear links.

5. A deployment mechanism as defined in claim 4 wherein said actuator has a common pivot mounting with the pivot joint connection of one of said pairs of links to said ram air turbine.

6. A deployment mechanism as defined in claim 1 wherein the rear link is shorter than the front link.

* * * * *